US012607976B1

(12) United States Patent
Russell

(10) Patent No.:    US 12,607,976 B1
(45) Date of Patent:        Apr. 21, 2026

(54) SYSTEM AND METHOD OF AUTOMATED PLANT CONTROL UTILIZING HIGHER ORDER POLYNOMIALS FOR TRAJECTORY MANAGEMENT OF CONTROL SIGNALS

(71) Applicant: Birket IP Holdings, Inc., Winter Garden, FL (US)

(72) Inventor: David Wayne Russell, Winter Garden, FL (US)

(73) Assignee: BIRKET IP HOLDINGS, INC., Winter Garden, FL (US)

( * ) Notice:    Subject to any disclaimer, the term of this patent is extended or adjusted under 35 U.S.C. 154(b) by 408 days.

(21) Appl. No.: 18/325,389

(22) Filed:    May 30, 2023

Related U.S. Application Data

(60) Provisional application No. 63/346,469, filed on May 27, 2022.

(51) Int. Cl.
G05B 19/042        (2006.01)
(52) U.S. Cl.
CPC .. G05B 19/042 (2013.01); G05B 2219/25065 (2013.01)
(58) Field of Classification Search
CPC ................... G05B 19/042; G05B 2219/25065
See application file for complete search history.

(56)                References Cited

U.S. PATENT DOCUMENTS

| | | | | |
|---|---|---|---|---|
| 6,300,738 | B1 * | 10/2001 | Weinhofer ........... | G05B 19/416 318/568.22 |
| 2010/0301777 | A1 * | 12/2010 | Kraemer .............. | H05B 45/325 315/312 |
| 2014/0042932 | A1 * | 2/2014 | Tomasovics ........... | H05B 45/20 315/307 |

FOREIGN PATENT DOCUMENTS

| | | | | | |
|---|---|---|---|---|---|
| CN | | 113970905 A | * | 1/2022 | ........... G05B 19/416 |
| JP | | H05-336799 A | * | 12/1993 | |

* cited by examiner

*Primary Examiner* — Michael W Choi
(74) *Attorney, Agent, or Firm* — ALLEN, DYER, DOPPELT + GILCHRIST, P.A.

(57)                ABSTRACT

A method of automated plant control executed by a programmable controller includes generating a template including a defined number of steps to achieve a plant parameter overall change between plant parameter overall initial and final values. Each of the defined number of steps has a respective step change between a respective step initial and final values. The template is generated based on at least a second degree polynomial function extending between the overall initial and final values. The programmable controller also determines a respective control signal value for each of the steps, the respective control signal value determined based on a relative magnitude of the step change with respect to the overall change. The programmable controller implements each of the steps in sequence by outputting the respective control signal value until a sensed current plant parameter value reaches the respective plant parameter step final value.

9 Claims, 10 Drawing Sheets

PLANT MODEL WITH SIGMOID TRAJECTORY

CJR FIRST ORDER PLANT SECOND ORDER PARABOLIC CONTROL

PLANT OUTPUT (FEEDBACK)
CONTROL SIGNAL
SET POINT

TIME (SECONDS)

CONTROL SIGNAL (0-40)

CONTROL SYSTEM BLOCK DIAGRAM

PLANT MODEL WITH SIGMOID TRAJECTORY

ANGLE SET POINT AND PLANT ANGLE

TIME

ACTUAL PLANT ANGLE
DESIRED ANGLE
CONTROL BLOCK SETPOINT
BAND-LIMITED WHITE NOISE

SYSTEM AND METHOD OF AUTOMATED PLANT CONTROL UTILIZING HIGHER ORDER POLYNOMIALS FOR TRAJECTORY MANAGEMENT OF CONTROL SIGNALS

CROSS-REFERENCE TO RELATED APPLICATION

This application claims the benefit of U.S. Provisional Patent Application Ser. No. 63/346,469, filed on May 27, 2022, the contents of which are herein incorporated by reference in their entirety.

FIELD OF THE INVENTION

The present invention relates to control system design, and more particularly, to control systems which may not be easily linearized or where tuning of gain parameters is undesired.

BACKGROUND OF THE INVENTION

Control system regulators such as the Proportional, Integral, Derivative (PID) controller have been used for decades to provide a relatively simple and reliable methodology for creating a controlled transition from one value of one state of a control signal to another. The PID is usually defined as a control loop mechanism employing feedback that is widely used in industrial control systems and a variety of other applications requiring continuously modulated control. A PID controller continually calculates an error value as a difference between a desired setpoint (SP) and a measured process variable (PV) and applies a correction based on proportional, integral, and derivative terms. The time that is required for the transition to take place is variable depending on the differences between the prior state and the next state, loading of the system, the rate of change of the control signal itself, and the maximum rate of change of the plant model.

It must be noted, however, that the PID controller is often utilized as a first order approximation of higher order control systems. As such, the tuning required and errors created within the control system because the solution is only an approximation yields less than optimal results such as, but not limited to, overshoot, underdamping, and/or oscillation. Additionally, because the plant model must be linearized, control may only be stable over a sub-range of the plant's actual capabilities.

The PID controller's P term (Proportional) is explicitly tuned to provide an initial linear slope to the control signal output of the controller that feeds into the plant model to affect the state change. When the change is very small, this slope may be too large and when the state change is large the slope may be too small, or the rate of change of the plant output may change with loading, but to remain stable the slope is tuned to one particular value. This first-order straight line control signal is only capable of making the transition between two states in very simplistic and usually already linear plant models. Often it will reach a steady state value that is lower than the desired value or setpoint.

To offset this failure mode of the P term, the I term (Integral) is added and explicitly tuned to push the control signal output further towards the setpoint (SP). This term provides additional error in the form of Integral wind-up and it tends to make the system less stable and more susceptible to overshoot of the setpoint leading to oscillations.

To offset this failure mode of the I term which was initially added to mitigate the failure mode of the P term, the D term (derivative) is added and requires an additional tuned gain term to damp out and stabilize the system. It may, however, slow the time the control system takes to converge on the setpoint. All three terms are interdependent and must be tuned simultaneously. It can be seen in retrospect that the primary difficulties in the PID controller are all due to the initial decision to use a first-order approximate solution (a linear P term) to a higher-order problem.

While tuning has been largely automated in advanced control system development systems, it still requires knowledge or data capture of the plant model and the linearization of same which may limit the stable operating range of the system. In some cases, the true plant dynamics are simply not known. Attempting to tune a complex PID system by hand without detailed knowledge of the dynamics of the system is highly problematic.

A system and methodology to apply higher-order mathematics is needed to solve these problems in control system state change without tuning.

SUMMARY OF THE INVENTION

It should be appreciated that this Summary is provided to introduce a selection of concepts in a simplified form that are further described in the Detailed Description. This summary is not intended to be used to limit the scope of the claimed subject matter.

One important aspect of higher order control systems is that the response or feedback signal from the plant (i.e., the device being controlled) is a function of time, and therefore the output of the control system is dependent on time. The plant signal may vary in magnitude and time depending on some number of external factors, some of which may not be known to the control system such as, but not limited to, ambient temperature, loading, etc. Most graphs are depicted as the value of the control system signal (vertical axis) over time (horizontal axis) and in digital control systems the sample time is most often constant.

It must be noted, however, that time may also be considered as a variable, where the rate of change of the plant model may be the driver of the rate of change of the control signal, rather than the other way around. Secondly, the transfer function from one state to another may not be a first order equation such as $Y=mX+b$ as in the PID controller but higher orders such as $Y=aX^2+bX+c$ or even $Y=aX^3+bX^2+cX+d$. The first of these equations is that of a straight line, the second a parabola, and the third a sigmoid.

As shown in FIG. 1 as an example without limitation, the desired state change graph is shown 120. The desired setpoint is changed from a value of fifteen generic units 100 to thirty-five units 110 is shown by the setpoint line of the graph 120. The control signal is shown by the dashed line graph 150 and the resultant output of the plant model, which is used as feedback to the control system, is shown as the solid line graph 140.

The desired state change should increase quickly at the beginning then slow as it reaches the setpoint to avoid overshoot and oscillation. In general terms, a PID loop accomplishes this desired transition trajectory (fast at start and slowing as it reaches the Setpoint) by measuring the difference (error term) between the current value of the plant output and the setpoint and altering the control signal depending on the tuned slope of the P term, then based on the response of the system the control system calculates the value of the error term, the integral of the error term, and the differential or rate of change in the error term. The control signal is clocked at a constant sample rate or time period between changes. It can be seen that the error term is the primary driving factor of the I and D terms.

An alternative method of reaching this trajectory begins with utilizing a higher order polynomial as an analogue to the P term to avoid the problems that must be fixed later in the I and D terms, in this example without limitation a parabolic template is shown in FIG. 2. In this example, without limitation, a parabola 200 is shown created specifically for a rising plant state control change from 20 to 40 units over a horizontal period of 15 steps 210, time is not explicitly specified. A falling state change would invert the parabola's direction. The parabola begins at the current plant state value of twenty generic units and continues until it reaches the plant state value of forty. As can be seen by the circle markers, the vertical rate of change is high 220 at the beginning of the parabola and slows significantly 230 as the parabola rises towards the setpoint and meets the setpoint exactly at the point where the parabola's tangent reaches 0 (the vertex) 240. In this example, the right-hand side of the parabola is unused.

As the parabolic template is specifically derived to cover the difference between the start value and the setpoint, the I and D terms are not required and therefore the normal PID error term, as expressed as the difference between the current plant value and the setpoint, is similarly unnecessary. In this invention the error term is now defined as the time difference between the parabolic template 250 and the actual plant value 260. The controller therefore functions to modulate the time represented by steps in the parabolic template, such that the parabola affects the equivalent slope of the plant, causing it to reach the setpoint at the vertex 240. The time, however, is driven by the plant model, not the parabolic template. The error term causes the parabola to hold at each step until the error is removed by the plant output reaching the desired parabolic step point, and then the process continues with a new step point and a new error value. The control system output value that drives the plant response is determined by a form of a reference control signal value 510 as depicted in FIG. 5, and as will explained in greater detail below.

Referring again to FIG. 1, the parabola defined to manage the control signal trajectory can be rising 130 or falling 140. The parabolic trajectory is imposed on the control signal by utilizing both the magnitude and the derivative or rate of change of the plant feedback signal, in other words time is used as a variable rather than a constant. The first step of the control system in this example is to vary the control signal 160 to the plant in order to initiate a change of value in the plant output towards the setpoint. The magnitude of each change of the control signal is determined by the corresponding step in the parabola. As the system has no tuning, it also has no "knowledge" of what the magnitude or time delay of the plant response will be. While the controller can be implemented as a discrete time computer system as depicted in FIG. 3, with an internal clock or sample time that is sufficient to capture the response of the plant, this is not a requirement.

At some point in time after the initial change in control system output, a change in the plant output feedback will be detected which meets the magnitude of the first step in the control as per the parabola 160. The time of this step change is variable, so the parabola is, by construction, constrained by the plant itself as to the time required to reach the setpoint. Once the first parabola step is reached by the plant, the controller increases the output control signal again by the amount of the next step of the parabola 170. This process continues with the parabola dictating smaller and smaller steps as the plant nears the setpoint in the number of steps programmed into the parabolic trajectory.

This same methodology can be utilized in rising 130 or falling 140 state changes, and for large changes of state or very small changes 180. In this example, the start of the system has a small error between the current plant feedback value of 15.06 and the setpoint of 15.00. This is corrected by a small falling parabola with the form $aX^2+bX+c$, where a=6.1E-04, b=−0.0122, and c=15.06. The next setpoint change from 15 to 35 is controlled with a rising parabola of a=−0.0887, b=2.6622, and c=15.0337.

According to an embodiment of the present invention, a method of automated plant control executed by a programmable controller includes generating a template including a defined number of steps to achieve a plant parameter overall change from a plant parameter overall initial value to a plant parameter overall final value. Each of the defined number of steps has a respective plant parameter step change between a respective plant parameter step initial value and a respective plant parameter step final value. The template is generated based on at least a second degree polynomial function extending between the overall initial value and the overall final value. The programmable controller also determines a respective control signal value for each of the defined number of steps, the respective control signal value for each of the defined number of steps being determined based on a relative magnitude of the respective plant parameter step change with respect to the plant parameter overall change. The programmable controller implements each of the defined number of steps in sequence by outputting the respective control signal value until a sensed current plant parameter value input to the programmable controller reaches the respective plant parameter step final value.

According to an aspect of the present invention, the programmable controller initially outputs a reference control signal value and measures a reference plant parameter response induced by the reference control signal value. The programmable controller generates the template based on the at least second degree polynomial function using the reference plant parameter response. The programmable controller can use the reference control signal value as a maximum value when determining the respective control signal values and can use a lower control signal value than the maximum value to achieve a slower plant response. The programmable controller can also use the reference plant parameter response to correlate the respective control signal value for each of the defined number of steps to the relative magnitude of the respective plant parameter step change with respect to the plant parameter overall change.

According to another aspect of the present invention, the programmable controller optimizes the defined number of steps.

According to a further aspect, the polynomial function is a third degree polynomial function. A final tangent to the polynomial function at the plant parameter overall final value can advantageously be zero, as can an initial tangent to the polynomial function at the plant parameter overall initial value.

According to an additional aspect, the control signal is an on/off control signal and the respective control signal values include at least on/off frequency and on/off duration values.

According to another aspect, the programmable controller only controls plant parameter changes in one direction and natural plant response is relied on to effect plant parameter changes in the opposite direction.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
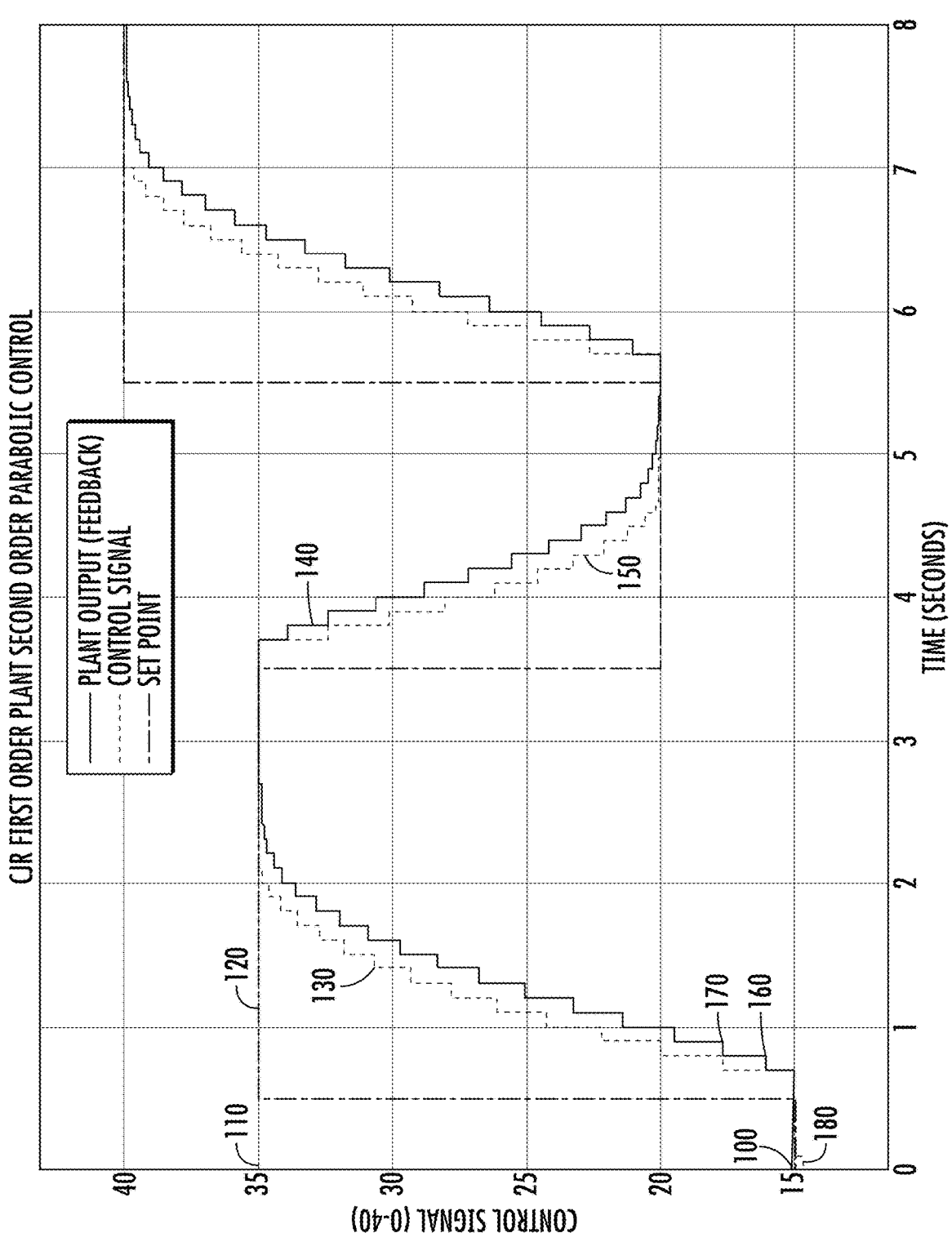

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

FIG. 1 depicts a control system output in response to a change in setpoint, resulting in the graphed plant feedback output of a first order plant with second order parabolic control.

Figure 2:
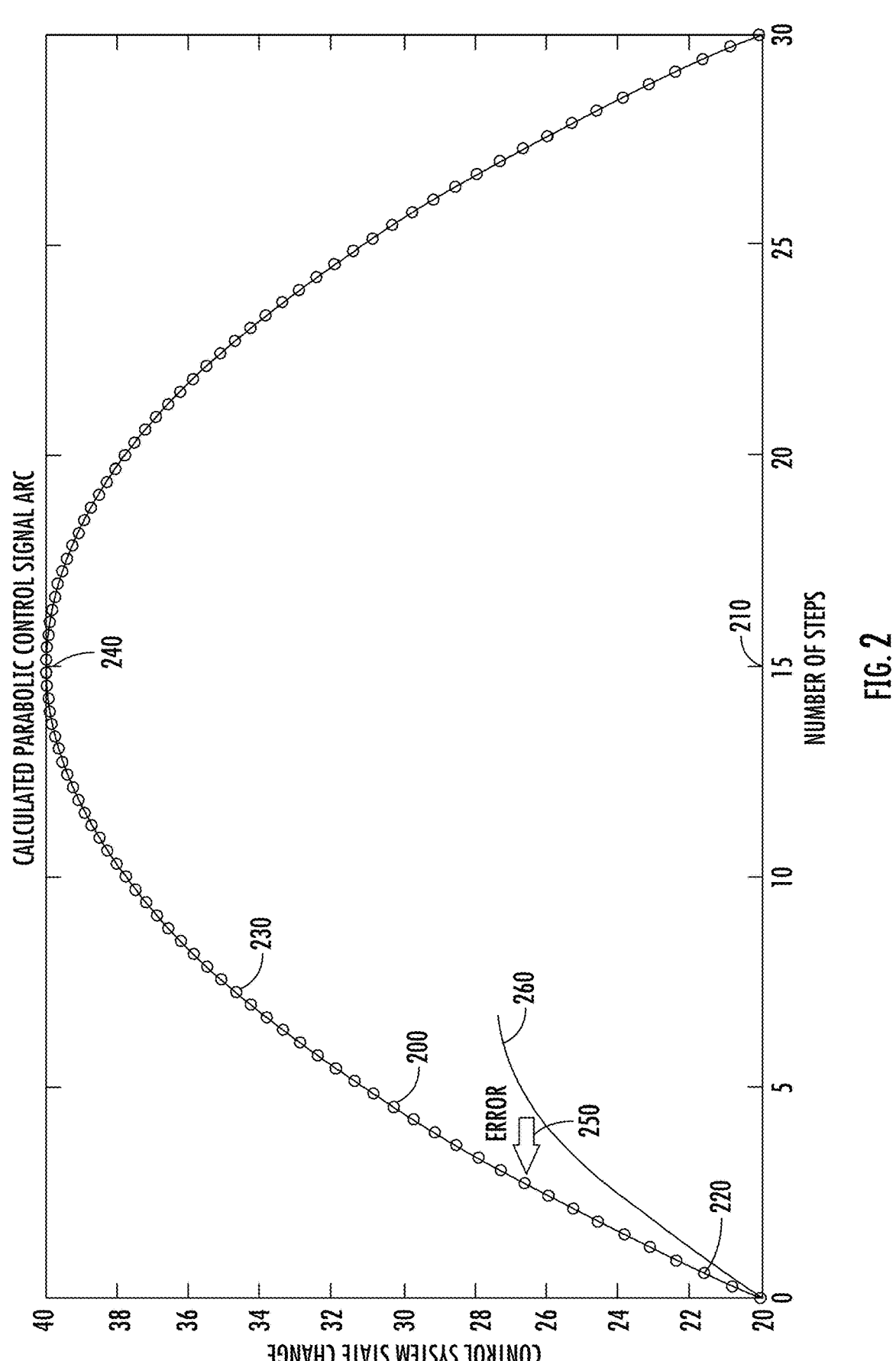

FIG. 2 depicts a parabolic curve designed to provide a profile for a given magnitude change of state and number of steps.

Figure 3:
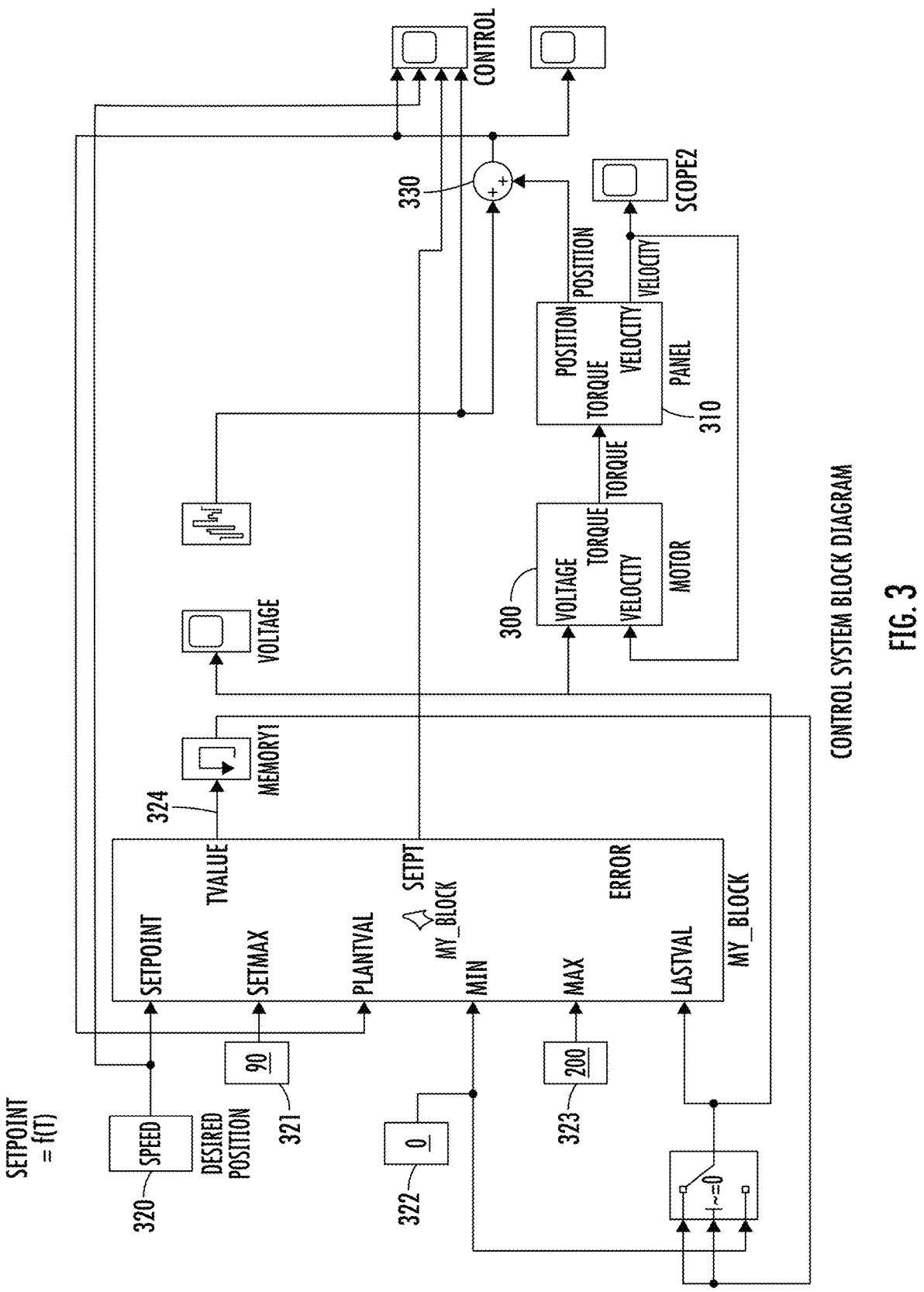

FIG. 3 depicts the functional blocks of a microprocessor system implementing the controller and an exemplar plant model of a motor and rotatable platform.

Figure 4:
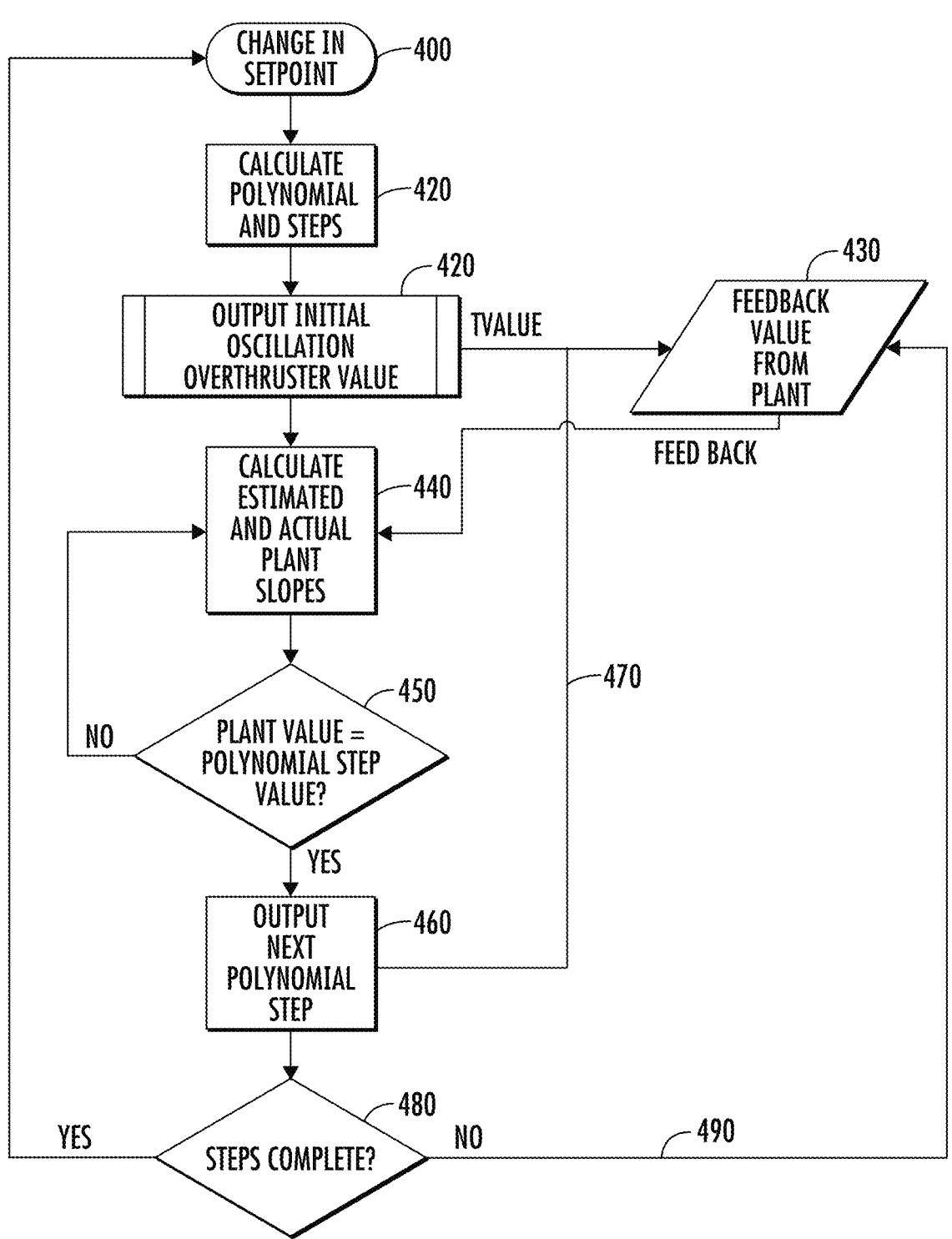

FIG. 4 depicts a flowchart diagram of one example of the controller implementation.

Figure 5:
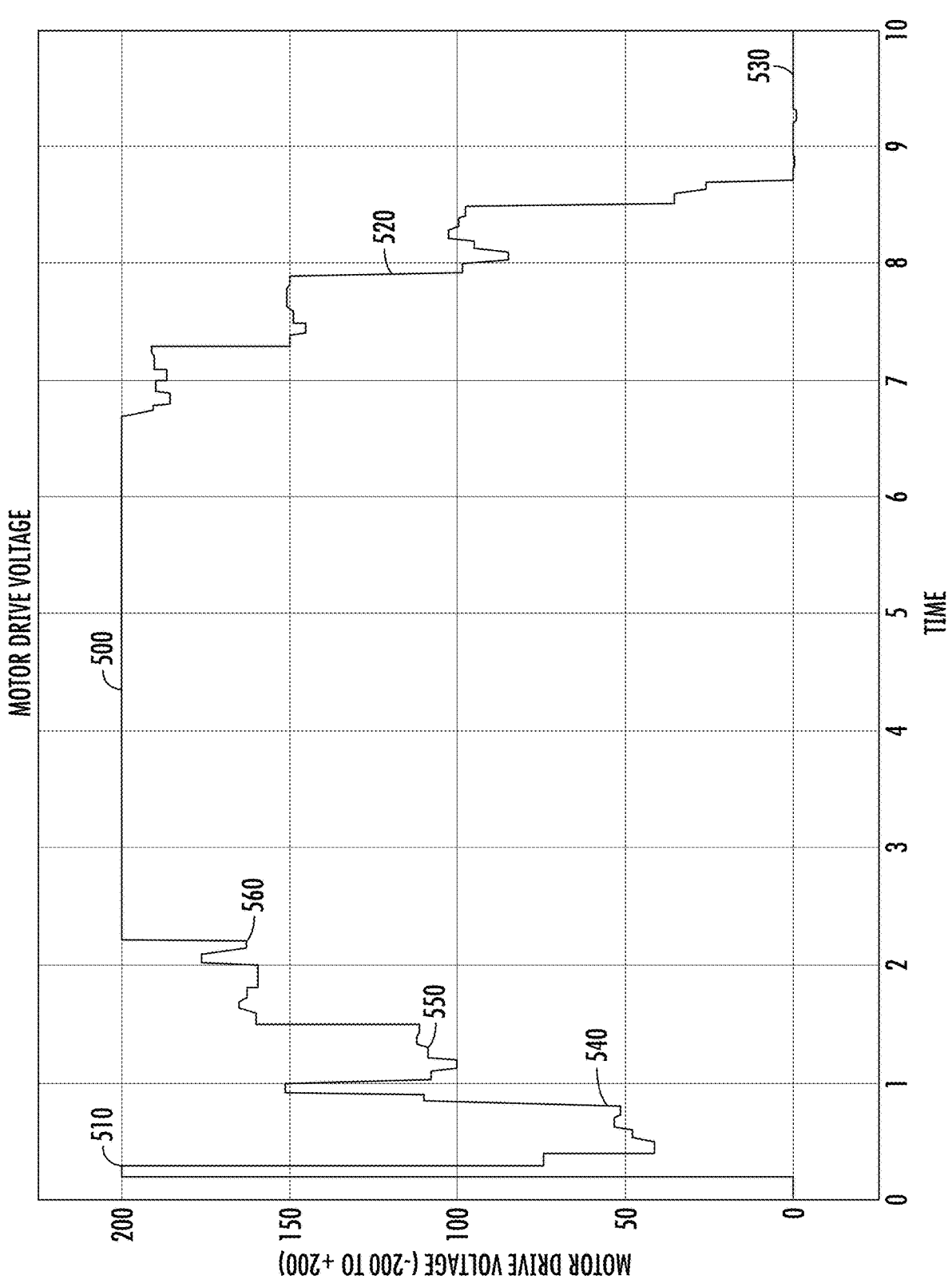

FIG. 5 depicts a graph of the motor drive voltage output of the controller of FIG. 3.

Figure 6:

FIG. 6 depicts a graph of an exemplar controller utilizing a sigmoid template.

Figure 7:
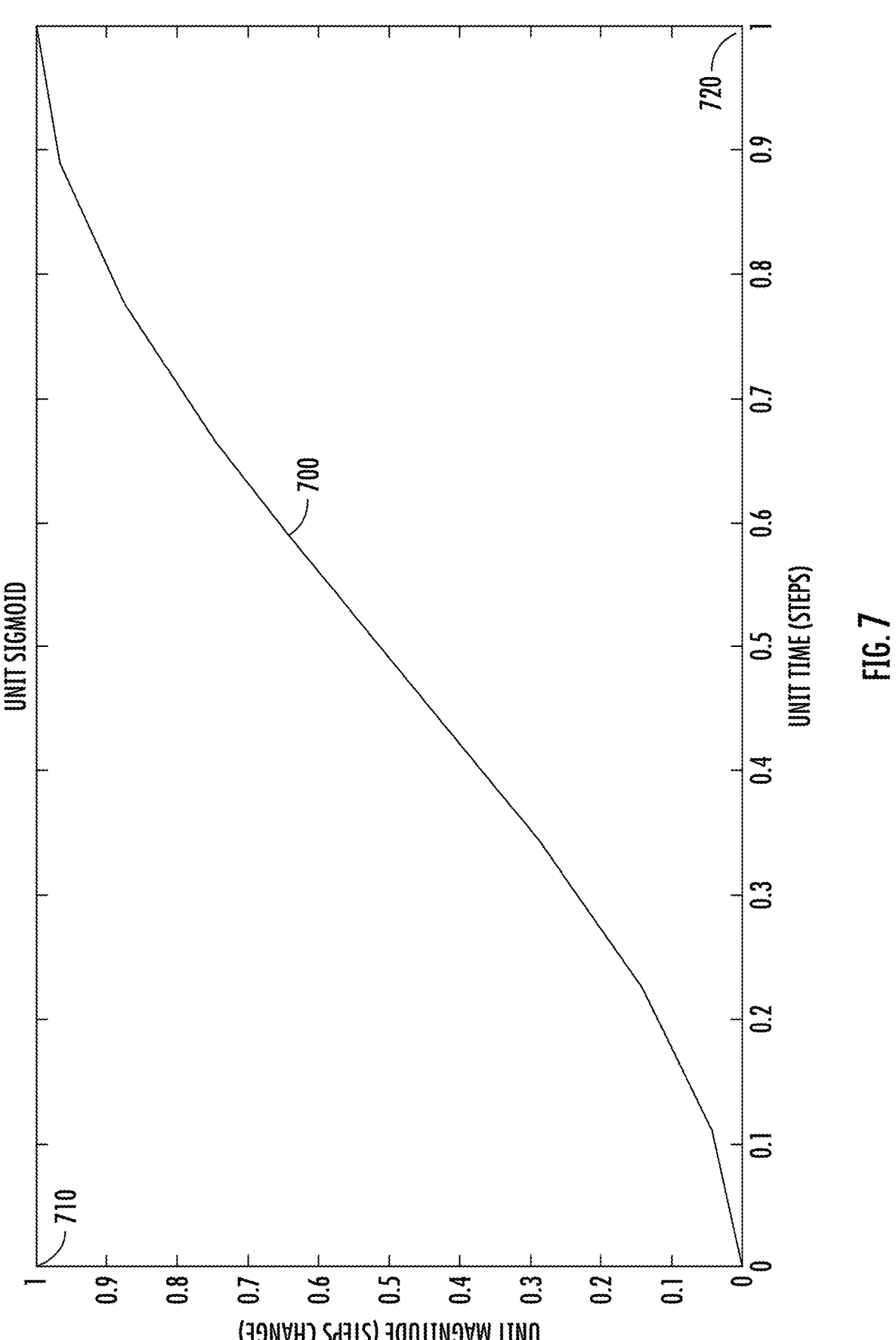

FIG. 7 depicts a graph of an exemplar Unit Sigmoid function.

Figure 8:
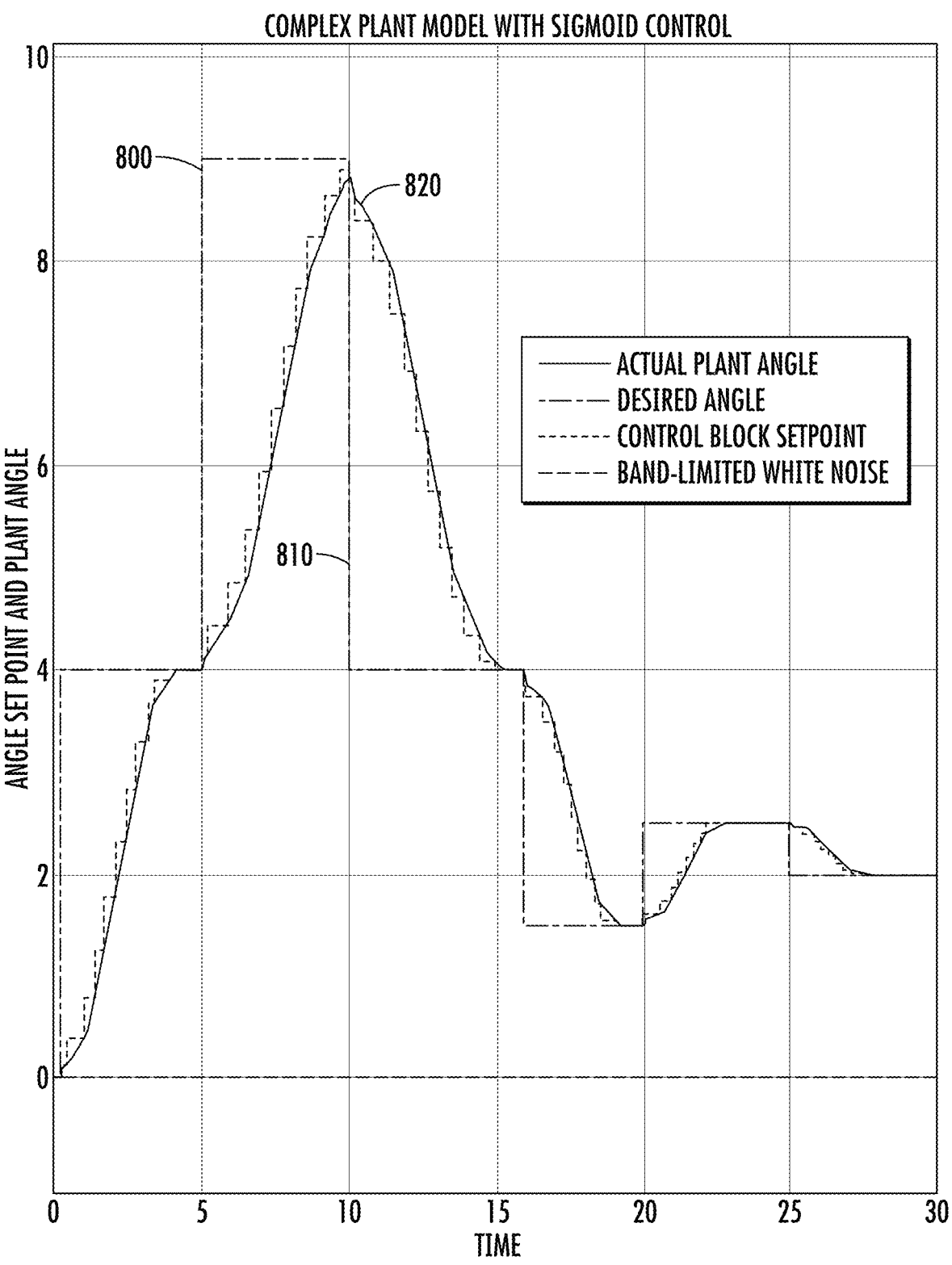

FIG. 8 depicts a discontinuous restart of the controller when the setpoint changes before completion of the previous controller trajectory.

Figure 9:
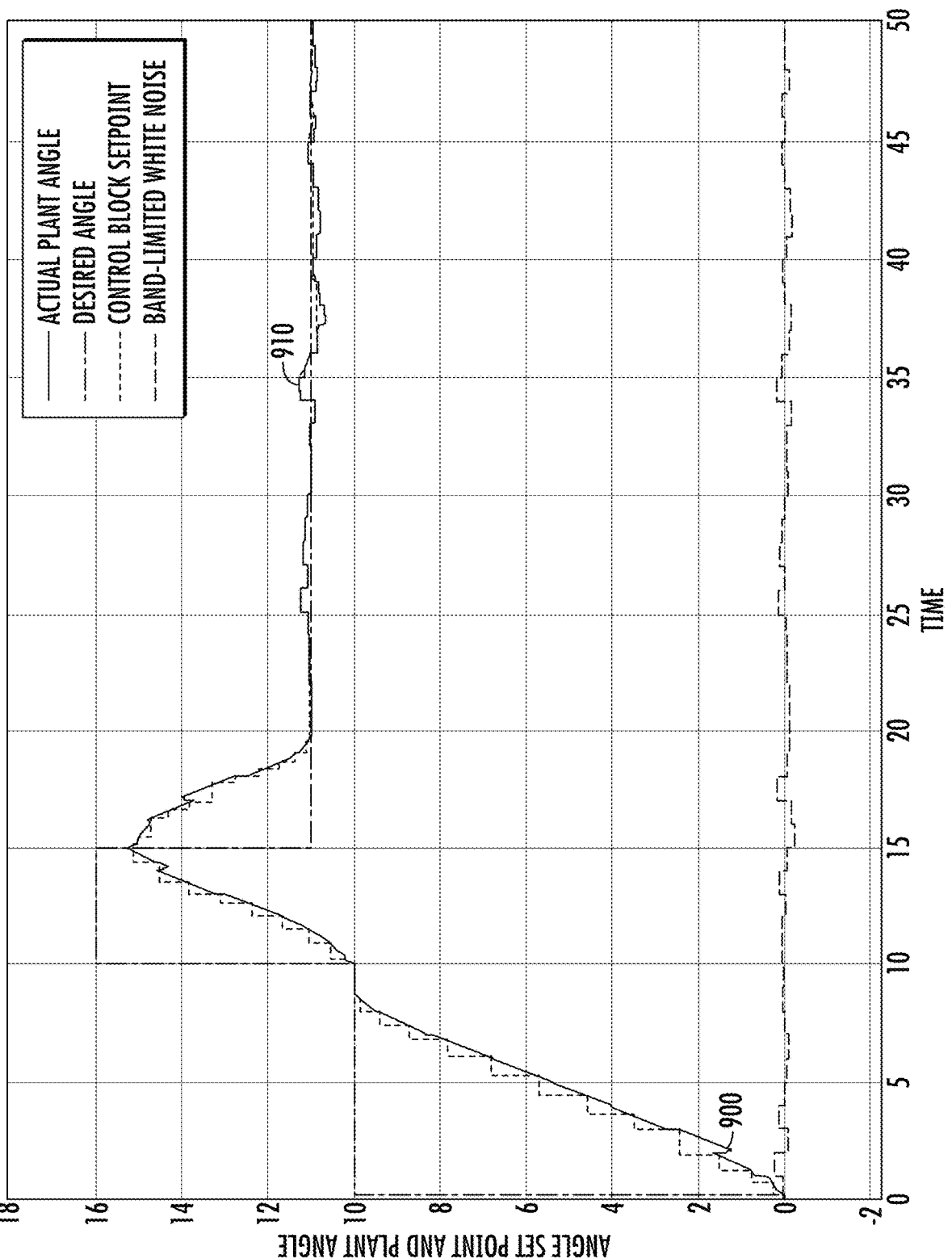

FIG. 9 depicts the controller operation when the plant output changes but the setpoint remains the same.

Figure 10:
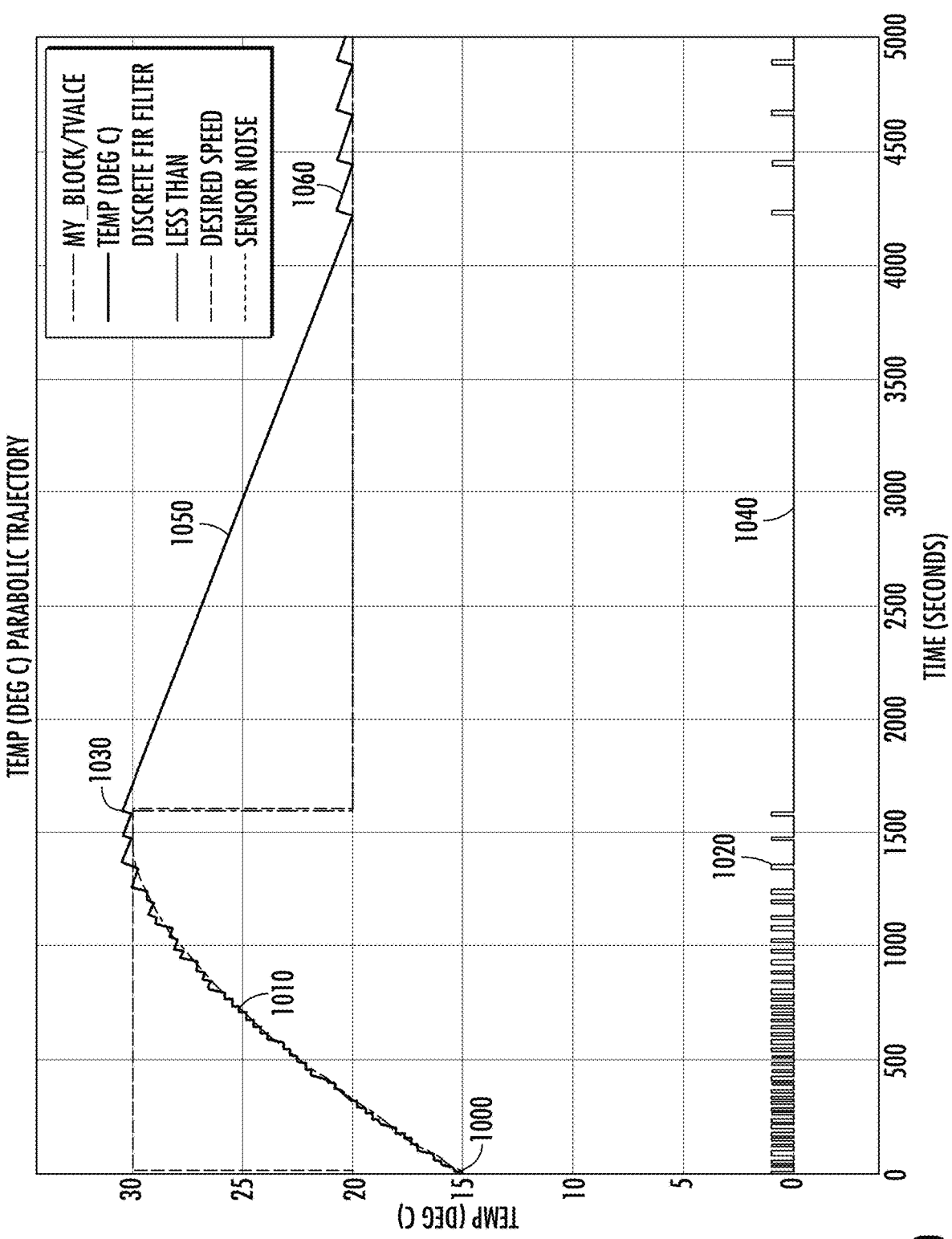

FIG. 10 depicts the controller operation in a common example of a boiler voltage control system or "bang-bang" controller.

DETAILED DESCRIPTION OF PREFERRED EMBODIMENTS

The following detailed description illustrates embodiments of the invention by way of example and not by way of limitation. The description clearly enables one familiar in the art to make and use the disclosure, describes several embodiments, adaptations, variations, alternatives, and use of the disclosure, including what is currently believed to be the best mode of carrying out the disclosure. The disclosure is described as applied to an exemplary embodiment namely, systems and methods for the creation of a trajectory-based control system. However, it is contemplated that this disclosure has general application to feedback control systems in industrial, commercial, military, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The different illustrative embodiments recognize and take into account a number of different considerations. "A number", as used herein with reference to items, means one or more items. For example, "a number of different considerations" means one or more different considerations. "Some number", as used herein with reference to items, may mean zero or more items.

In FIG. 1 a parabolic control signal 130 drives the plant to the setpoint and stabilizes at that point. In this example, the control signal output by the controller directly controls the plant parameter to be changed.

The controller of FIG. 3 depicts a more complex example case. In this embodiment without limitation a motor 300 accepts a drive voltage of +/−200V (forward and reverse) and the motor drives a solar panel 310 rotating around its central post. The motor torque and equation of motion are $$\frac{di}{dt} = \frac{1}{L}\left(V - K_g K_f \frac{d\theta}{dt} - Ri\right).$$
$$T = K_g K_i i$$

The rotation of the solar panel is driven by the torque of the motor. The equation of motion for the panel is $$\frac{d^2\theta}{dt^2} = \frac{1}{J}\left(T - K_d \frac{d\theta}{dt}\right).$$

The controller has inputs of Setpoint 320, SetMax 321, PlantValue (feedback) 330, Minimum Setpoint Value 322, and Maximum Setpoint Value 323. The output is the Tvalue (control signal to the motor) 324. In this exemplar model noise may be injected into the solar panel position feedback data 330. In this embodiment the input setpoint 320 is the desired angle for the solar panel (0 to 90 degrees=SetMax), which is not directly correlated to the +/−200V control output signal 324. In addition, to hold the solar panel at a given point the motor drive output value from the control block must go to 0, rather than remaining at the setpoint as was depicted in FIG. 1. Zero is the point of zero torque.

The value of the control signal used to effect the plant parameter change for each step can be based on a relative magnitude of the step change with respect to the overall change. In an implementation where the slope of the polynomial function approaches zero as the final overall plant value is reached—resulting in smaller step changes approaching the final overall value—the control signal value will then decrease as the plant approaches the final value.

In another embodiment, more or less information about the control requirements and plant model might be presented to the control block such as, but not limited to, the max positive and negative Tvalue output, the zero point (no change expected from the plant) of Tvalue, minimum setpoint value, and so on. For instance, in the above described case, the maximum control signal output is known to be the 200V value. In other cases, this maximum value may not be known. In other embodiments additional information that may be of use to the system in general could be produced by the control block such as, but not limited to, error estimates or other internal variables of the block. One familiar with the art would comprehend that additional values on the input or output would not change the intent of the invention.

In this embodiment the control system polynomial will be third order (a Sigmoid as opposed to the earlier Parabolic curve) as shown in FIG. 7. While any higher-order polynomial can be utilized in the controller (for example, if the plant model was known to be a fourth-order system, a fourth-order polynomial template would be applicable, parabolic and sigmoid templates will fit many applications.

In comparison, parabolic trajectories start with a high rate of change and end with a low rate of change. In some circumstances it may be more compatible with the plant model to start and end with a low rate of change. In addition to control system values being sent to a plant model, this system might be used in spatial trajectories to match a planned physical transition of a vehicle or device, for example from one state to another based on parameters or rate of change. In such an embodiment a sigmoid would, for example without limitation, be more compatible than a parabola to represent a vehicle changing lanes. In another embodiment animated figures or assembly robots are usually programmed with choreographed and timed movements, but on occasion it is necessary to switch the trajectory being executed from one planned choreography to another. In this embodiment the sigmoid 700 provides a more seamless transition between two poses of the mechanism than would a parabolic template 200.

Referring to FIG. 7, a Unit Sigmoid is shown in the graph 700 which begins at 0,0 and ends at 1,1 such that the maximum vertical value is 1.0 710 and the maximum horizontal axis is also 1.0 720. This allows us to simply multiply the value of the change in step value at any point in the curve by the value of the setpoint state change rather than computing a different polynomial for each state change. The horizontal axis would be Time, however this is again determined by the plant output feedback timing rather than a constant sample rate. All that matters is that the number of steps ends at 1.0 in X and Y.

FIG. 4 depicts a flow diagram of the control process. The computational process begins when a difference is detected between the setpoint of the system 400 and the plant value. This may be caused by an explicit change in the setpoint value or by a change in the plant output value. The percentage of change in the setpoint versus the max known value of the setpoint allows an estimate to be made as to the output value that could cause a similar percentage difference in the plant output. These two values may not be well correlated, and one may be of a higher order than the other. For example without limitation, a 10 degree change angle in the solar panel set point may result in a 100 volt difference in the output of the control block which might, in turn result in a 5 or 50 degree change in the plant angle. One purpose of the invention is to produce the desired output without tuning, therefore the plant model is unknown at this point, so the change in the plant output that results from the control change is similarly unknown.

One guess that can be made is a linear approximation, such that the percentage change in the input results in a similar percentage change in the output. In other embodiments machine-learning, Kalman or other filters, optimization techniques, heuristics, neural networks, binary search or tree techniques, or other higher order polynomials might be used for the initial estimate or to better correlate the output to the input values. Because this initial guess affects only a small portion of the overall control trajectory, the correctness or accuracy of this guess is not critical. Most often this estimated value will err on the side of a larger value to ensure some change in the plant feedback is induced. This initial spike is referred to as the oscillation overthruster and is generated via the controller initially outputting a reference control signal value. In FIG. 5 an example without limitation of this initial overthrust sample 510 is depicted.

This initial output value is only intended as an estimate in order to receive information from the plant, in the form of a reference plant parameter response, which will be used to guide further estimates. At the same time the number of steps and the Unit Sigmoid or other polynomial would be calculated. In FIG. 4, this step of calculating the initial output value is shown as block 410. In FIG. 5 an example of the oscillation overthruster component of the trajectory in the output is depicted 510 and in FIG. 6 an example of the stimulus and output of the example is depicted 600. If the computed initial output value is not proportional to the expected change in the plant output, then the resultant value and subsequently the slope 600 of that first response from the plant could be greater than the initial template setpoint 610 which could slow convergence of the system. With proportional calculation of the overthrust value a similar slope relative to the first step of the trajectory is achieved whether the displacement is 100, 10, 1, 0.1, 0.001, 0.0001, etc.

Once the first data is received from the plant in response to the change in the control output value 430, the system now has sufficient information to begin manipulating the output to achieve the desired control trajectory. For each sample of the plant output feedback, the slopes of the control setpoint (the current desired angle) and the plant output feedback (the current solar panel angle) are compared and used to set the next Tvalue control output 440. The sample rate of the control system may be constant and periodic, but the changes in the internal setpoint value or each step in the sigmoid function only occur once the plant output has caught up with the current control point value.

In this manner while the unit sigmoid is a generic shape, the slope of the plant output determines the overall rate of change and therefore the time that is required for the system to achieve the desired change of state values. This can be observed in FIG. 5 where the motor drive voltage saturates 500 during the center time of the state change and FIG. 6 where the maximum slope of the output is achieved during this same period 620.

At each sample if the plant value has met or exceeded the polynomial step value 450 then the next step is output 460 and the process repeats 470 until all of the steps of the polynomial are complete 480. Once complete, the system would either hold on that value or return to zero point depending on the organization of the input data. In this instance the control output drops rapidly 520 as the slope of the polynomial tends to zero and then fully to the zero value once complete 530.

The entire process of this example is depicted in FIG. 6 and the control block output Tvalue associated with this graph is shown as FIG. 5. The system setpoint is altered from 0 to 10 degrees 630 causing an initial calculation of the number of steps for this setpoint differential and the initial overthrust value 510 and initial plant response 600. The plant response causes the step values for the sigmoid function to be calculated and output while each sample of the plant output causes an updated computation of the Tvalue output 540, 550, 560. As the slope of the sigmoid function changes, this causes the Tvalue output to change and the slope of the plant output is reduced until it meets the Curve Junction point 640. The excitation voltage then drops to zero 530 and the system awaits the next change in the setpoint 400.

FIG. 8 depicts an example where the setpoint 800 changes before the CJR algorithm has completed the initial state transition. In this case the plant output 810 and sigmoid trajectory have not yet completed when the setpoint changes. In this case the system simply resets such that the new setpoint becomes the state change goal, and the current plant output is the starting point and a new sigmoid trajectory and new overthrust initial output value are calculated and the remainder of the algorithm continues as before.

Referring to FIG. 9, there exists a secondary mechanism that must also be addressed, this is the case where the setpoint remains the same, but the plant output changes. This may be due to increased loading on the plant 900 or noise in the feedback signal 910. Just as with the setpoint changes, the system simply reconfigures once the change is detected to form a new polynomial slope to bridge between the setpoint and the plant output even if the difference is small.

FIG. 10 shows the system configured as a simple boiler temperature control or "bang-bang" controller. The initial temperature 1000 is 15 degrees C. and the temperature rise in the boiler is controlled by a parabolic trajectory 1010. The boiler control is an on/off signal 1020. The setpoint is lowered 1030, however the plant control has no ability to cool the boiler, so no additional boiler heat "on" commands are issued 1040 while the boiler cools naturally 1050. Once the new setpoint is reached the boiler heat control continues to be turned on 1060 to main temperature.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of automated control of a motor driving a rotatable platform via the torque of the motor, the method comprising:

generating, with a programmable controller, a template curve including a defined number of motor steps to achieve an overall change from an initial motor step value to a final motor step value, each of the defined number of motor steps has a respective change between a respective motor step initial value and a respective motor step final value, the template curve being generated based on at least a third order polynomial velocity function defining a sigmoid extending between the initial motor step value and the overall final motor step value;

determining, with the programmable controller, a respective motor control signal value for each of the defined number of motor steps, the respective motor control signal value for each of the defined number of motor steps being determined based on a relative magnitude of the respective motor step value change with respect to the motor step overall change;

wherein the programmable controller is configured to detect a difference between the setpoint of the motor and maximum known value of the setpoint as an initial output motor control signal value, calculate the number of motor steps relative to the template curve for each sample of the motor output, compare the slope of the motor control signal value setpoint as the desired angle of the platform and current angle of the platform to set a next motor control signal value, at each sample, if the motor step value has met or exceeded a polynomial velocity function value, then repeat until all steps of the polynomial velocity function value are complete and a motor step final value is achieved, wherein time is applied as a variable and an error term defined as the time difference between the template curve and an actual motor step value, said programmable controller configured to modulate the time represented by steps in the template curve to reach a setpoint at a vertex of the template curve and hold at each motor step value until the error is removed by the motor step value reaching a desired template curve step point and continuing with a new step point and new error value.

2. The method of claim 1, further comprising initially outputting, from the programmable controller, a reference motor control signal value; and measuring a response of the motor step value that is induced by the reference motor control signal value;

wherein the programmable controller generates a template curve using the response of the motor step value.

3. The method of claim 2, wherein the programmable controller uses the reference motor control signal value as a maximum value when determining the motor control signal values.

4. The method of claim 3, wherein the programmable controller is operable to use a lower motor control signal value than the maximum motor control signal value to achieve a slower response of the motor step value.

5. The method of claim 2, wherein the programmable controller uses the response of the motor step value to correlate the respective motor control signal value for each of the defined number of motor step values to the relative magnitude of the respective motor step value change with respect to an overall change.

6. The method of claim 1, wherein the programmable controller is configured to optimize the defined number of motor step values.

7. The method of claim 1, wherein a final tangent to the template curve at a final motor step value is zero.

8. The method of claim 7, wherein an initial tangent to the tangent curve on initial motor step value is zero.

9. The method of claim 1, wherein the motor control signal value is an on/off control signal value and the respective motor control signal values include at least on/off frequency and on/off duration values.

* * * * *